US006178612B1

(12) United States Patent
Gernstein

(10) Patent No.: US 6,178,612 B1
(45) Date of Patent: Jan. 30, 2001

(54) METHOD OF CONVERTING A TRUCK SLEEPER CAB TO A DAY CAB

(75) Inventor: Dan H. Gernstein, Omaha, NE (US)

(73) Assignee: TRP, Inc., Omaha, NE (US)

( * ) Notice: Under 35 U.S.C. 154(b), the term of this patent shall be extended for 0 days.

(21) Appl. No.: 09/168,824

(22) Filed: Oct. 8, 1998

(51) Int. Cl.$^7$ .................................................. B23P 17/04
(52) U.S. Cl. ..................................... 29/401.1; 296/190.02
(58) Field of Search ........................... 296/190.02, 26.08; 29/401.1, 897.2

(56) References Cited

U.S. PATENT DOCUMENTS

| 3,558,180 | * | 1/1971 | Algire . | |
|---|---|---|---|---|
| 4,050,735 | * | 9/1977 | Molnar | 296/190.03 |
| 4,589,181 | * | 5/1986 | Phillips | 29/401.1 |
| 4,599,780 | * | 7/1986 | Rohrbacher . | |
| 4,775,179 | * | 10/1988 | Riggs . | |
| 4,787,670 | * | 11/1988 | Bentz . | |
| 5,000,501 | * | 3/1991 | Cunha | 29/401.1 |
| 5,305,512 | * | 4/1994 | Ward | 29/401.1 |
| 5,310,239 | * | 5/1994 | Koske et al. . | |
| 5,560,673 | * | 10/1996 | Angelo . | |
| 5,769,486 | * | 6/1998 | Novoa et al. . | |

* cited by examiner

Primary Examiner—S. Thomas Hughes
Assistant Examiner—Steven Blount
(74) Attorney, Agent, or Firm—Zarley, McKee, Thomte Voorhees & Sease; Dennis L. Thomte

(57) ABSTRACT

A method of converting a truck sleeper cab to a day cab comprising the steps of: providing a truck cab having a sleeper cab riveted to the rearward end thereof; removing the rivets which connect the sleeper cab to the truck cab; removing the sleeper cab from the truck cab to create an opening at the rearward end of the truck cab; providing a rear wall member which resembles the rear wall of a day cab and which is designed to close the opening created by the removal of the sleeper cab from the truck cab; and securing the rear wall member to the truck cab to close the opening whereby the truck cab has the appearance of a day cab.

7 Claims, 6 Drawing Sheets

METHOD OF CONVERTING A TRUCK SLEEPER CAB TO A DAY CAB

BACKGROUND OF THE INVENTION

1. Field of the Invention

This invention relates to a method of converting a truck sleeper cab to a day cab. More particularly, the invention relates to a method whereby a truck cab having a sleeper cab integrally formed therewith is converted to a day cab by removing the sleeper cab from the truck cab and replacing the same with a rear wall member so that the modified truck cab is a day cab rather than a sleeper cab.

2. Description of the Related Art

Many of the trucks which haul freight across the nation include a sleeper cab integrally formed with the truck or operator's cab so that the driver may, at appropriate times, sleep in the sleeper cab. The truck cabs which include sleeper cabs compartments are quite large and do serve a very useful purpose while the truck is being used for long hauls. However, the trucks having the truck sleeper cabs are normally removed from long haul service after two or three years due to the expiration of leases, large accumulated mileage, etc. When the trucks having sleeper cabs are removed from long haul service, and are being sold as a used truck, an operator is hesitant to purchase the same for further long haul use due to the normally high mileage thereon. Further, if the trucks having sleeper cabs are to be used for local routes, those trucks, due to the large cab size thereof, are not well-suited for local use.

Used trucks of the type which are commonly referred to as "day cabs", that is, a truck cab without a sleeper compartment, normally have a much larger resale value than truck sleeper cabs because there is a shortage of day cabs.

SUMMARY OF THE INVENTION

The method of converting a truck sleeper cab to a day cab is described which comprises the steps of: (1) providing a truck cab having a sleeper compartment riveted to the rearward end thereof; (2) removing the rivets which connect the sleeper compartment to the truck cab; (3) removing the sleeper compartment from the truck cab, thereby creating an opening at the rearward end of the truck cab; (4) providing a rear wall member which resembles the rear wall of a day cab and which is designed to close the opening created by the removal of the sleeper compartment from the truck cab; (5) and securing the rear wall member to the truck cab to close the opening whereby the truck cab has the appearance of a day cab. The rear wall member is riveted to the truck cab and has a window provided therein. The rear wall member is provided with a series of protrusions extending therefrom which resemble heads of rivets so that the resultant day cab more nearly resembles a conventional day cab. The rear wall member is comprised of a fiberglass material and has reinforcing members embedded therein.

It is a principal object of the invention to provide a method of converting a truck sleeper cab to a day cab.

Still another object of the invention is to provide a method of converting a truck sleeper cab to a day cab wherein the resultant day cab closely resembles conventional day cabs.

Still another object of the invention is to provide a method of converting a truck sleeper cab to a day cab wherein a fiberglass rear wall member is used to close the opening created by the removal of the sleeper cab and wherein the rear wall member has rivet-like protrusions extending therefrom.

Still another object of the invention is to provide a method of converting a used truck sleeper cab to a day cab which enhances the value of the used truck.

Still another object of the invention is to provide a method of converting a truck sleeper cab to a day cab so that the resultant cab is more suited for local use.

Yet another object of the invention is to provide a method of converting a truck sleeper cab to a day cab which involves the use of a rear wall member comprised of reinforced fiberglass material.

Still another object of the invention is to provide a method of converting a truck sleeper cab to a day cab which is readily accomplished.

These and other objects will be obvious to those skilled in the art.

DESCRIPTION OF THE PREFERRED EMBODIMENT

Figure 4:
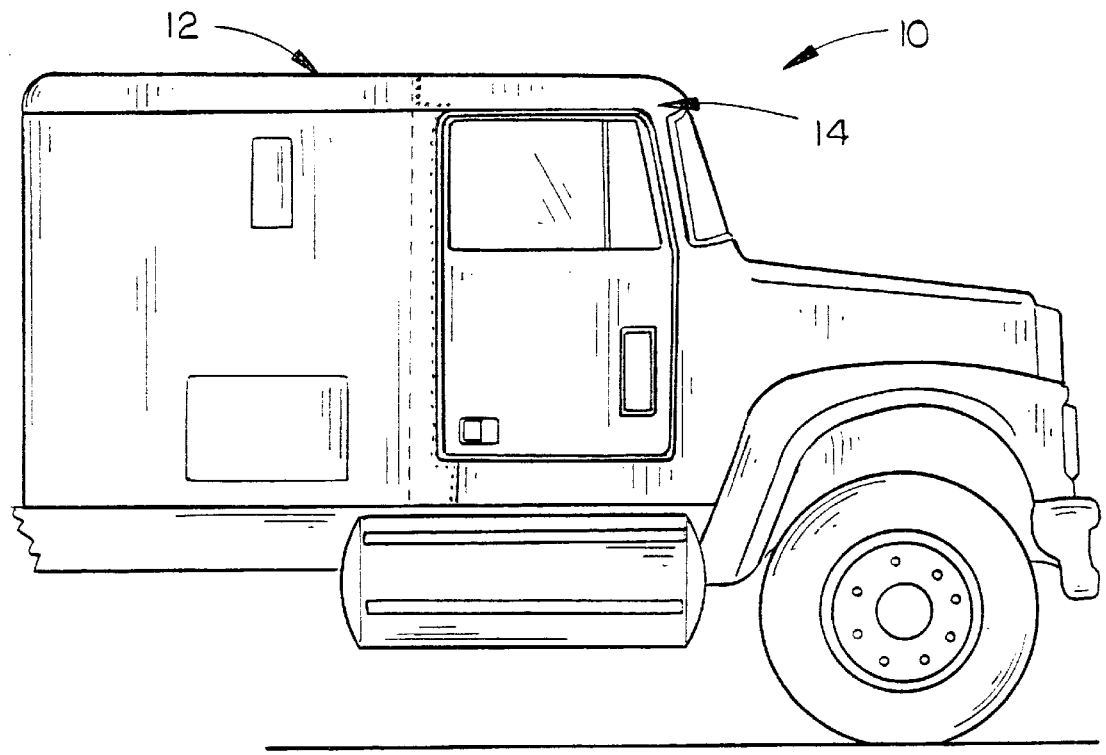
FIG. 4 is a side view of a truck sleeper cab.

In FIG. 4, the numeral 10 refers to a conventional truck of the truck sleeper cab type including a sleeper cab or sleeper compartment 12 which is riveted to the rear of the driver's cab or compartment 14.

When it is desired to convert the truck sleeper cab of FIG. 4 to a day cab so that the truck will have a greater resale value on the used truck market, the sleeper compartment or cab 12 is removed from the operator's cab 14 by removing the rivets connecting the same. If the sleeper cab or compartment 12 is connected to the rear of the floor member 16 of the operator's cab, that connection is also removed so that the entire sleeper cab may be removed from the truck, thereby creating an opening at the rear of the cab. That opening is closed by the rear wall member referred to generally by the reference numeral 18. Rear wall member 18 includes a rear wall 20 having an opening 22 at the lower end thereof which is adapted to receive angle member 24 extending therethrough which is bolted to the floor member 16 by bolts 26 and which has a plate 28 bolted thereto by bolts 30. Plate 28 is riveted to the lower end of back wall 20, as illustrated in FIG. 6.

Rear wall member 18 includes a pair of forwardly extending portions 32 and 34 at the upper forward ends thereof and forwardly extending portions 36 and 38 extending forwardly from the lower forward portion of the side walls 40 and 42. Rear wall member 18 includes a cap portion 44 which is integrally formed with the rear wall member, but gives the appearance that it is a member riveted thereto by the protrusions 46 which resemble rivets to make the resultant product more nearly appearing like a conventional day cab. Further, rear wall 20 is also provided with a plurality of rivet-like protrusions 48 extending rearwardly therefrom to give the rear wall member the appearance of a conventional riveted day cab. Rear wall 20 is provided with an area 50 which may be cut out therefrom so that a window 52 may be placed therein. Further, rear wall member 20 is provided with reinforced plate members 54 embedded therein for strengthening purposes.

Figure 1:
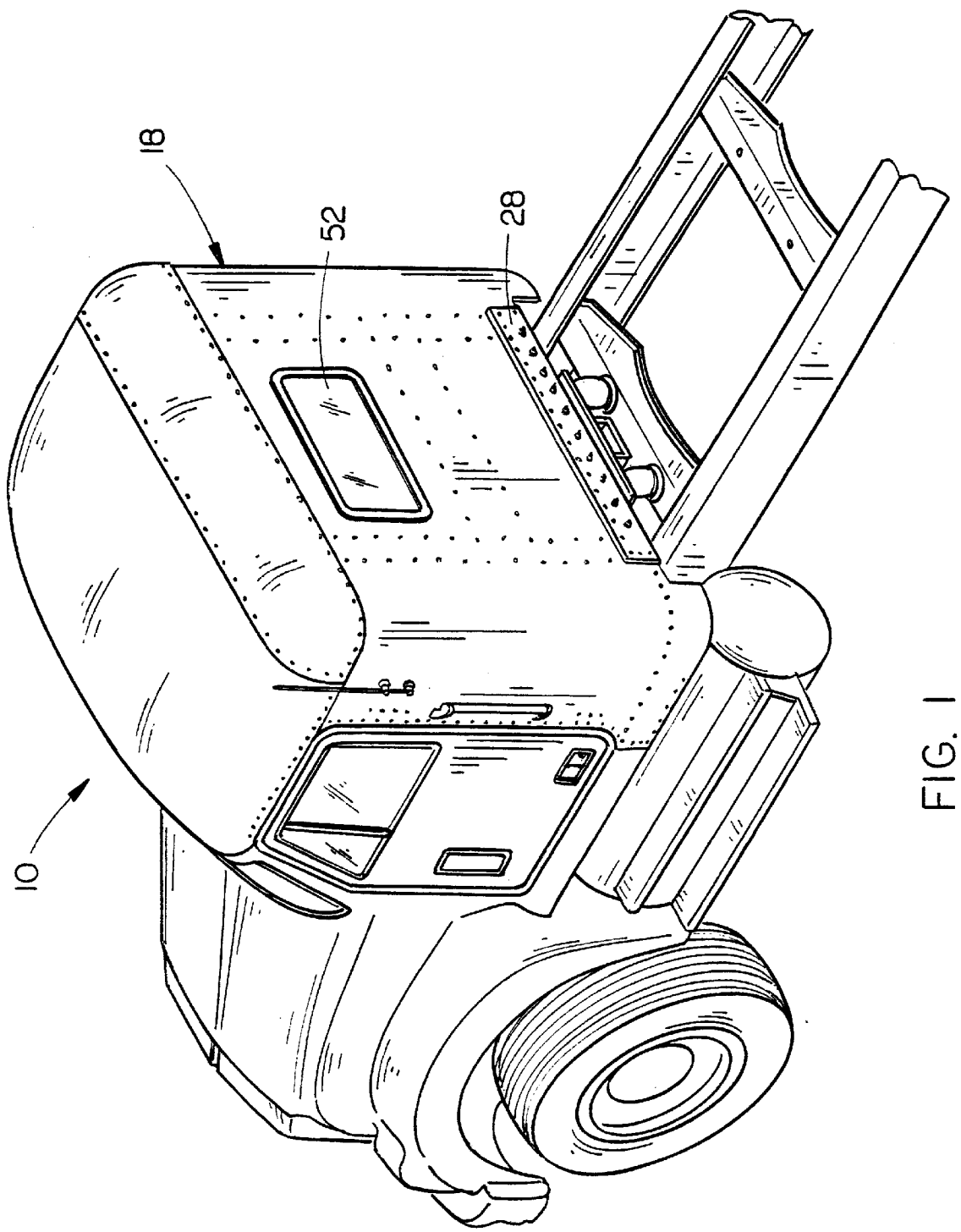
FIG. 1 is a rear perspective view of the finished product of this invention.
Figure 2:
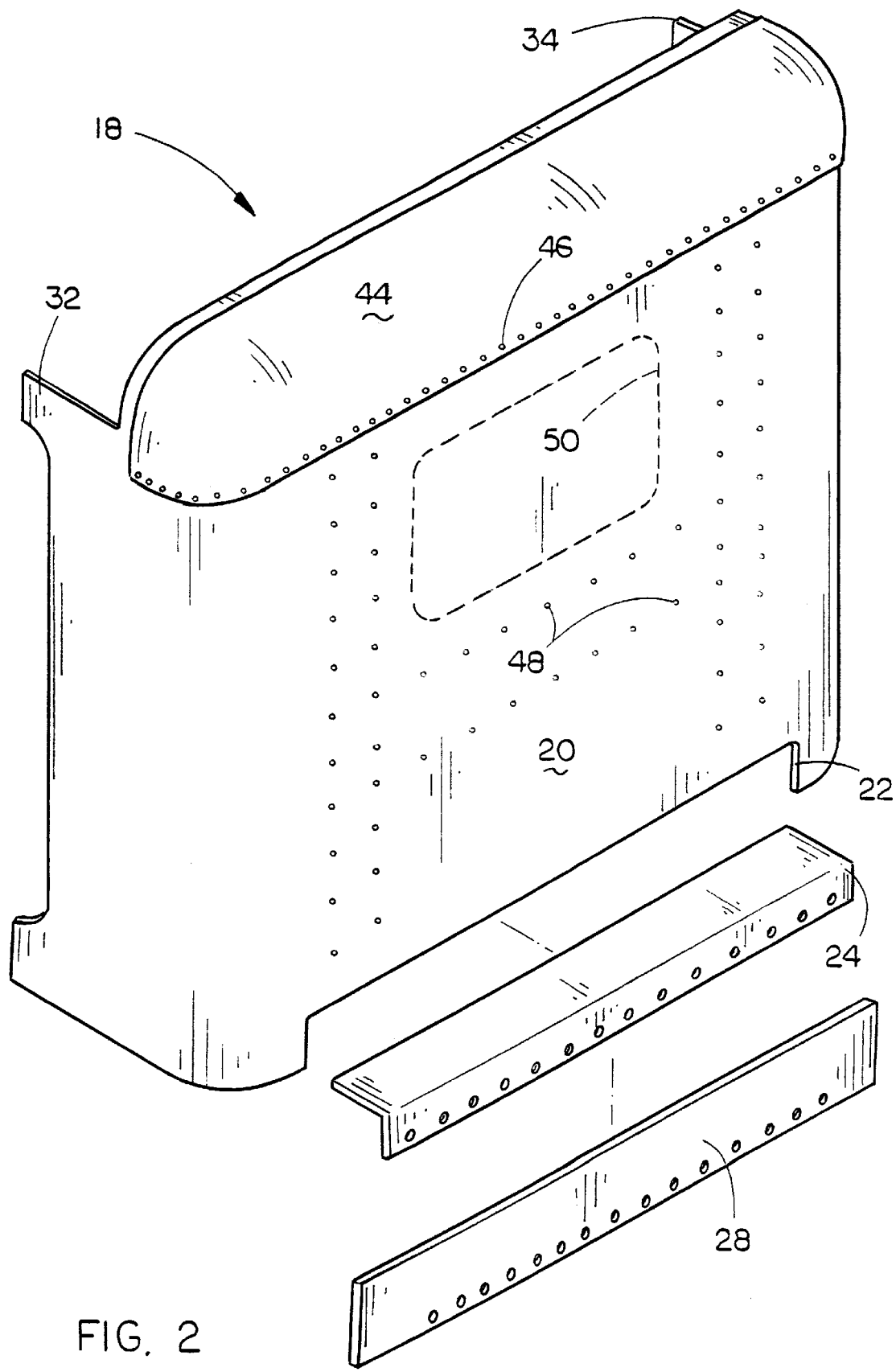
FIG. 2 is an exploded perspective view of the rear wall member which is used to convert a truck sleeper cab to a day cab.
Figure 3:
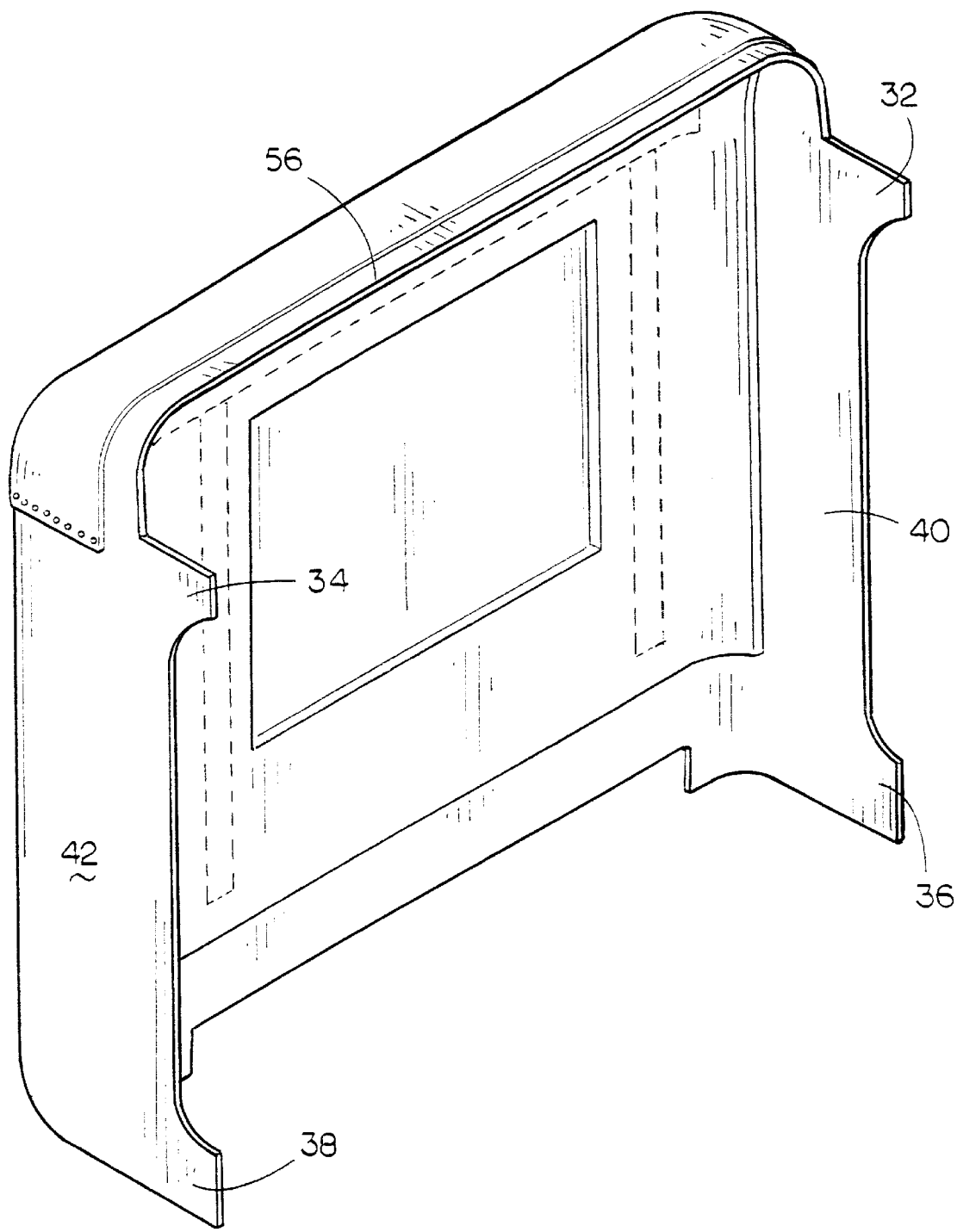
FIG. 3 is a front perspective view of the rear wall member which is used to convert a truck sleeper cab to a day cab.
Figure 5:
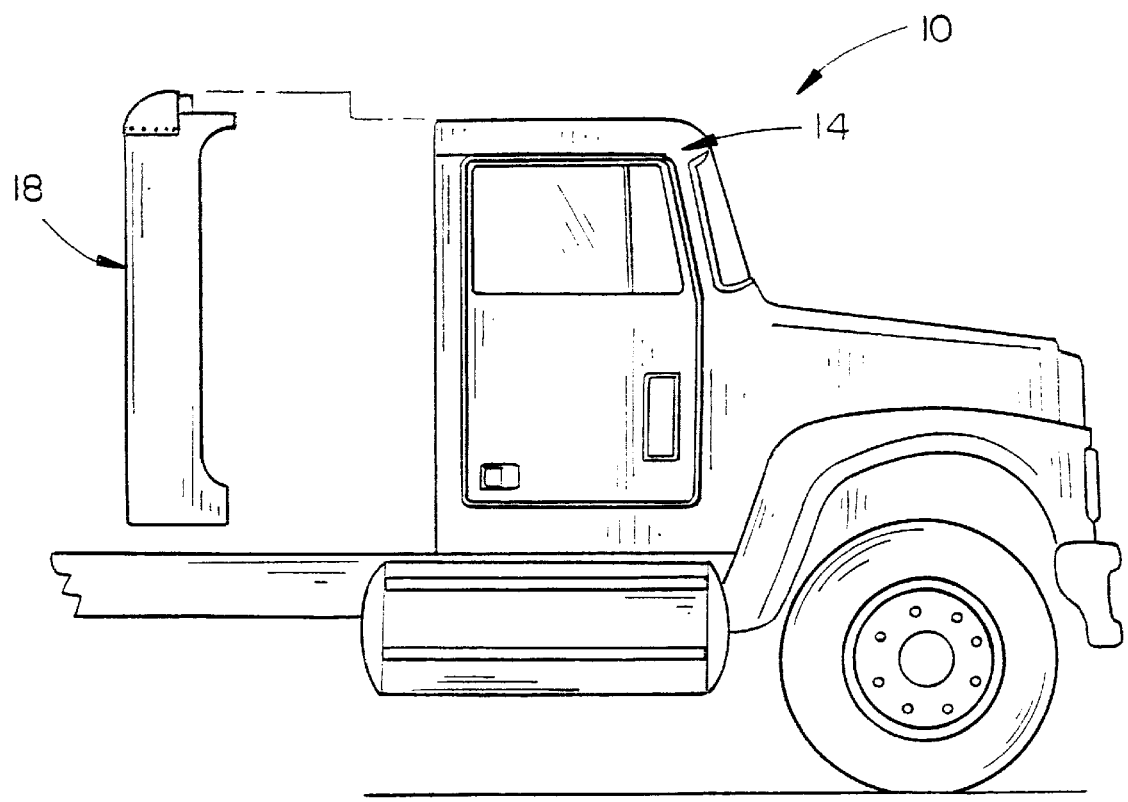
FIG. 5 is a view similar to FIG. 4 except that the sleeper cab has been removed from the truck of FIG. 4 and the rear wall member of this invention is being installed thereon.
Figure 6:
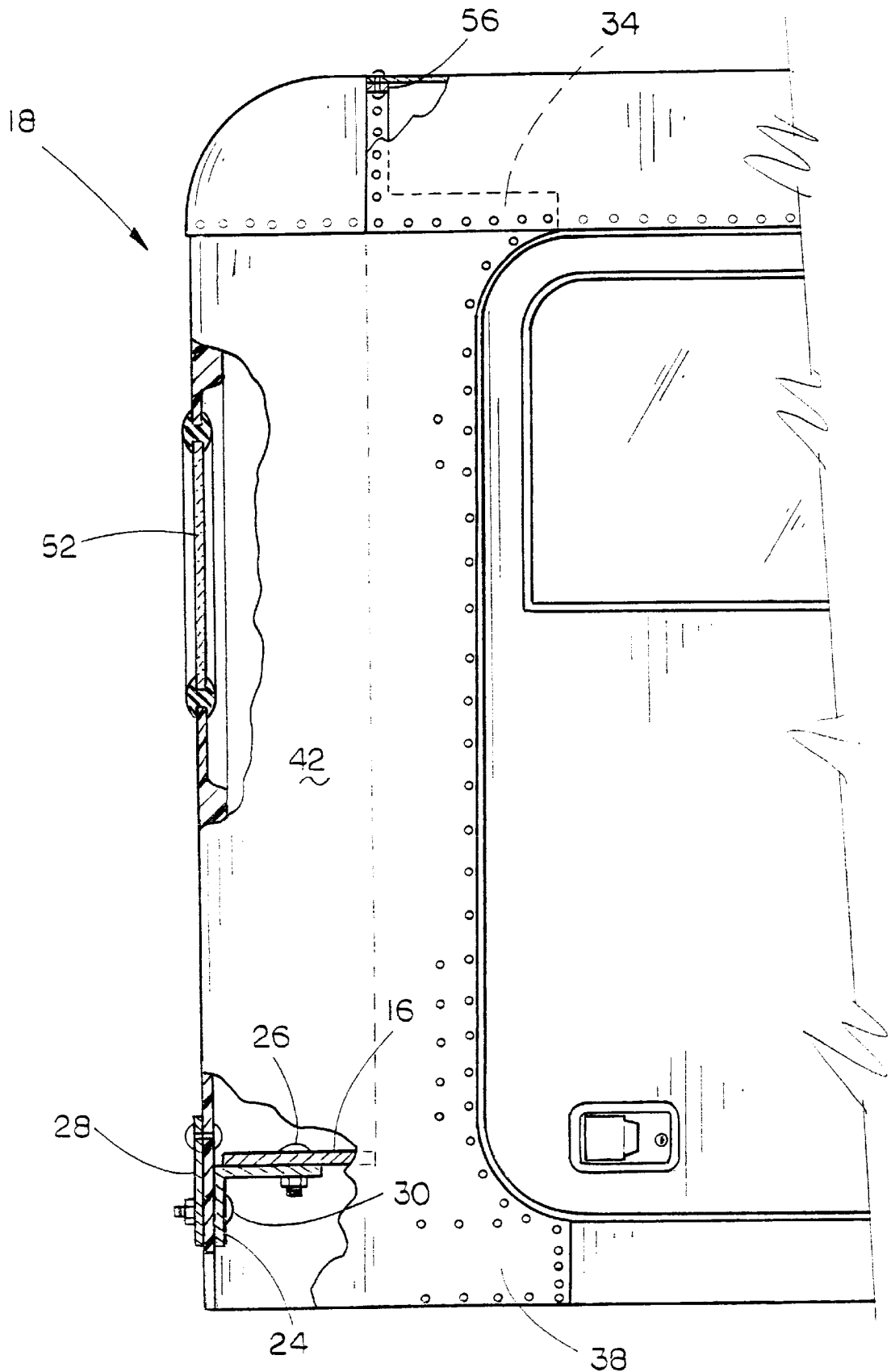
FIG. 6 is a side view of the truck sleeper cab of FIG. 1 with portions thereof cut away to more fully illustrate the invention.
Figure 7:
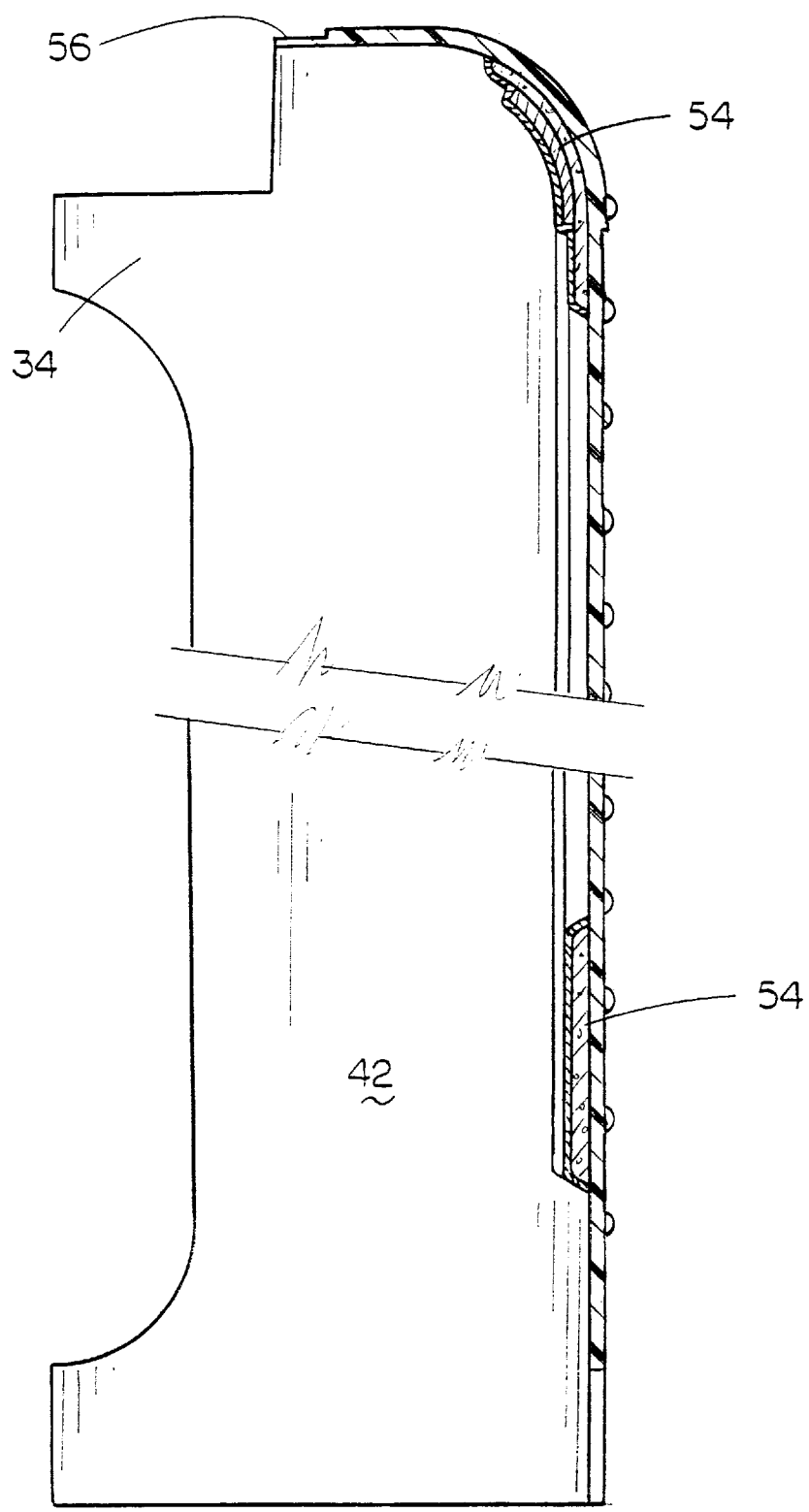
FIG. 7 is a partial sectional view of the rear wall member.

To complete the conversion of the truck sleeper cab to a day cab, the rear wall 18 is positioned at the rear of the operator's cab, as illustrated in FIGS. 5, 6 and 1. The protruding portions 32, 34, 36 and 38 are riveted to the rear of the truck cab, as illustrated in FIG. 6, as are the forward edges of side walls 40 and 42. Further, the upper forward edge 56 of the rear wall 18 is also riveted to the roof of the operator's cab, as also illustrated in FIG. 6. The resultant product is best seen in FIG. 1 and when the rear wall member 18 has been installed on the operator's cab as described, a truck day cab is the result. The fact that the rear wall member 18 includes rivet-like protrusions and has the configuration of a rear wall of a day cab, a highly desirable and more valuable used truck is achieved.

Thus, it can be seen that the invention accomplishes at least all of its stated objectives.

I claim:

1. The method of converting a truck sleeper cab to a day cab, comprising the steps of:

providing a truck cab having a sleeper cab riveted to the rearward end thereof;

removing the rivets which connect said sleeper cab to said truck cab;

removing the sleeper cab from said truck cab thereby creating an opening at the rearward end of the truck cab;

providing a rear wall member which resembles the rear wall of a day cab and which is designed to close the said opening created by the removal of said sleeper cab from said truck cab;

and securing said rear wall member to said truck cab to close said opening whereby the truck cab has the appearance of a day cab.

2. The method of claim 1 wherein said rear wall member is riveted to said truck cab.

3. The method of claim 2 wherein said rear wall member has a window provided therein.

4. The method of claim 2 wherein said rear wall member is provided with a series of protrusions extending therefrom which resemble heads of rivets.

5. The method of claim 1 wherein said rear wall member is comprised of a fiberglass material.

6. The method of claim 5 wherein said fiberglass material has reinforcing members embedded therein.

7. The method of claim 1 wherein said truck cab has a floor member provided thereon which extends through a lower portion of said opening and wherein a reinforcing plate is secured to said floor member and said rear wall member.

\* \* \* \* \*